United States Patent [19]

Mayer et al.

[11] Patent Number: 5,750,580
[45] Date of Patent: May 12, 1998

[54] POLYURETHANE ELASTOMERS PREPARED FROM ALIPHATIC POLYISOCYANATES AND POLYESTERETHER POLYOLS

[75] Inventors: Eduard Mayer, Dormagen; Jürgen Grönen, Overath, both of Germany

[73] Assignee: Bayer Aktiengesellschaft, Leverkusen, Germany

[21] Appl. No.: 661,280

[22] Filed: Jun. 10, 1996

[30] Foreign Application Priority Data

Jun. 16, 1995 [DE] Germany .......... 195 21 798.5

[51] Int. Cl.$^6$ .......... C08J 9/04; C08G 18/42; C08G 18/48
[52] U.S. Cl. .......... 521/51; 521/160; 521/172; 521/173; 528/67; 528/68; 528/76; 528/77; 528/80; 528/83
[58] Field of Search .......... 521/51, 160, 172, 521/173; 528/68, 67, 76, 77, 80, 83

[56] References Cited

U.S. PATENT DOCUMENTS

| | | | |
|---|---|---|---|
| 3,079,350 | 2/1963 | Bernstein | 521/172 |
| 3,164,568 | 1/1965 | Nordt et al. | 521/172 |
| 3,483,169 | 12/1969 | Case et al. | 528/76 |
| 4,065,410 | 12/1977 | Schäfer | 521/51 |
| 4,150,206 | 4/1979 | Jourquin et al. | 521/51 |
| 4,218,543 | 8/1980 | Weber et al. | 521/51 |
| 4,504,648 | 3/1985 | Otani et al. | 528/76 |
| 4,529,744 | 7/1985 | Wood | 521/131 |
| 4,534,907 | 8/1985 | Peerman et al. | 521/172 |
| 4,590,219 | 5/1986 | Nissen et al. | 521/51 |
| 4,604,410 | 8/1986 | Altenberg | 521/172 |
| 4,605,729 | 8/1986 | Barnes et al. | 528/301 |
| 4,929,697 | 5/1990 | Nodelman | 528/76 |
| 5,001,166 | 3/1991 | Mafoti | 521/159 |
| 5,145,883 | 9/1992 | Saito et al. | 521/172 |

FOREIGN PATENT DOCUMENTS

| | | |
|---|---|---|
| 1337448 | 10/1995 | Canada . |
| 2736685 | 3/1979 | Germany . |

*Primary Examiner*—Rabon Sergent
*Attorney, Agent, or Firm*—Joseph C. Gil; N. Denise Brown

[57] ABSTRACT

This invention relates to polyurethane elastomers produced by the reaction of polyisocyanates with polyesterpolyether polyols (diester-polyether diols) using the reaction injection molding process (RIM).

4 Claims, No Drawings

POLYURETHANE ELASTOMERS PREPARED FROM ALIPHATIC POLYISOCYANATES AND POLYESTERETHER POLYOLS

BACKGROUND OF THE INVENTION

This invention relates to polyurethane elastomers comprising the reaction product of polyisocyanates with polyesterpolyether polyols (diesterpolyether diols), and a reaction injection molding process (RIM) for their production.

It is known to produce reinforced, in particular rigid polyurethane elastomers, optionally containing urea with a density of above 0.9 g/cm$^3$ using the reaction injection molding process. These are obtained by crosslinking aromatic polyisocyanates with polyether or polyester polyols (as described in, for example, DE-A 2,513,817). In general, an aromatic diamine component, for example DETDA (industrial mixture of 1-methyl-3,5-diethyl-2,4- and -2,6-diaminobenzene), is added (as described in, for example, DE-A 3,827,595). Moldings produced in this manner exhibit excellent mechanical properties, such as modulus of elasticity, flexural modulus, elongation at break, hardness. They are suitable for many applications such as, for example, in the automotive sector.

Disadvantages of using moldings based on aromatic polyisocyanates and/or aromatic amine components are that they yellow when weathered or exposed to sunlight and the surface additionally roughens. This makes it necessary for these moldings to be subsequently lacquer coated for demanding applications such as, for example, in exterior automotive applications.

It is known, for example from DE-A 2,736,685, that the use of glycols as crosslinking agents in the reaction with aromatic isocyanates under current production conditions gives rise to only just tolerable setting times of at least two minutes.

The prevention of yellowing in PUR systems produced using the reaction injection molding process is particularly important with regard to directly colored moldings. PUR systems which give rise to directly colored moldings allow labor intensive and costly lacquer coating operations to be dispensed with. In this manner, it is possible to reduce the production costs of moldings exposed to weathering.

The obvious idea of transferring this experience to elastomers produced using the RIM process has hitherto failed to come to fruition on the one hand due to unfavorable demolding times and, on the other hand, due to the difficulty of incorporating large quantities of fillers, in particular fibrous or flat fillers, into such formulations (see DE-A 2,736,685 and DE-A 2,513,817). If, for example, glass fibers are incorporated into a polyol mixture according to this invention, for example in accordance with the teaching of DE-A 2,513,897 the polyol mixture separates. This may cause considerable problems for any industrial use.

The possibility of reliable production and of rapid demolding cycles while simultaneously achieving elevated mechanical properties, in particular hardness and flexural modulus, are essential features. It is only in this case that these materials are suitable as moldings, for example, in exterior automotive applications. With suitable catalysis, high demolding times may in particular be improved by using internal release agents. External release agents cause delays as they must be applied in an additional operation step.

As DE-A 2,736,685 discloses with regard to formulations based on aliphatic isocyanates, demolding times of approximately five minutes are generally required. DE-A 2,710,901 reports tack-free times (not identical to demolding times) of approximately 1 minute, which are made possible by specific combinations of catalysts. Demolding times of approximately 30 seconds are achieved (DE-3,827,595) in the industrial production of moldings for the automotive sector based on aromatic polyisocyanates in combination with aromatic crosslinking components (such as, for example, DETDA). It is also possible to incorporate large quantities of fillers into the elastomer in this process.

It is already known from DE-A 2,622,951 (believed to be the equivalent of U.S. Pat. No. 4,218,543) and DE-A 3,827,595, to produce polyurea elastomers containing urethane groups and fillers by the reaction injection molding process using polyisocyanates or polyisocyanate mixtures of the diphenylmethane series, relatively high molecular weight polyether polyols and alkyl-substituted aromatic amines, wherein both the one-shot process and the semi-prepolymer method may be used.

DE-A 2,513,817 describes the use of polyesters in the crosslinking agent mixture. However, the addition of polyesters gives rise to unfavorable glass holding capacity and phase stability (two phases are formed) of the polyol mixture (loc. cit. example 20). When polyether polyols are used alone, a substantially softer polymer matrix is moreover obtained. This may have an unfavorable effect on the mechanical properties of moldings produced therefrom.

The object of the present invention is to provide an economically advantageous process which may be performed on an industrial scale which allows the use of aliphatic or alicyclic polyisocyanates for the production of colorable polyurethanes with good surfaces or integral skin surfaces. These colorable polyurethanes are desired to be resistant to discoloration under the combined action of light and oxygen, and, by virtue of their physical properties are suitable, for example, for exterior automotive applications without additional lacquer coating.

It has now surprisingly been found that the use of specific polyesterethers in the liquid polyol mixture described as the crosslinking agent mixture during the production of colorable, light-fast polyurethanes based on aliphatic or alicyclic polyisocyanates results in a series of remarkable advantages. This is particularly true when fillers are used.

SUMMARY OF THE INVENTION

The present invention provides polyurethane elastomers optionally contain urea groups and comprises the reaction product of;

a) at least one liquid polyisocyanate component selected from the group consisting of aliphatic polyisocyanates, alicyclic polyisocyanates and mixtures thereof, b) optionally one or more isocyanate-reactive compounds having an average molecular weight of about 1000 to about 6000 and an average functionality of at least 2, c) at least one isocyanate-reactive compound having a molecular weight of less than 1000, preferably of less than about 500, wherein at least one of said compounds has a functionality of at least 2, d) from about 1 to about 30% by weight of fillers, based on the total weight of all the components of the elastomer, wherein an isocyanate index of 90 to 120 is maintained and at least one of the isocyanate-reactive compounds of component c) comprises a polyhydroxyl compound based on a polyesterether polyol.

The polyurethane elastomers which optionally contain urea groups wherein the reaction product may additionally comprise:

e) auxiliary substances and additives which are known per se in polyurethane chemistry.

The polyurethane elastomers according to the invention are produced using the reaction injection molding process (RIM process).

Thus, the present invention also provides a reaction injection molding process for the production of optionally cellular, elastic moldings having a closed surface layer and a density of greater than 0.9 g/cm$^3$. These polyurethane elastic moldings which optionally contain urea groups are prepared from a reaction mixture comprising:

a) at least one liquid polyisocyanate component selected from the group consisting of aliphatic polyisocyanates, alicyclic polyisocyanates and mixtures thereof, b) optionally one or more isocyanate-reactive compounds having an average molecular weight of about 1000 to about 6000 and an average functionality of at least 2, c) at least one isocyanate-reactive compound having a molecular weight of less than 1000, preferably of less than about 500, and a functionality of at least 2, and d) from about 1 to 30% by weight of fillers, based on the total weight of all the components of the elastomer.

wherein at least one of the isocyanate-reactive compounds in component c) comprises a polyhydroxyl compound based on a polyesterether polyol.

The reaction mixture which is used in the RIM process to prepare the optionally cellular polyurethane moldings may additionally comprise:

e) auxiliary substances and additives which are known per se in polyurethane chemistry.

When fillers are mixed with the polyol component c) which comprises a polyhydroxyl compound based on a polyesterether polyol in accordance with the present invention, the mixture is resistant to sedimentation, even for two or more days. It may straightforwardly be processed using the reaction injection molding process, i.e. no line blockages occur due to sedimentation, even when the plant is shut down. The mixture of fillers with the presently required polyesterether polyol remains as a single phase mixture.

If, for example, a polyether polyol or a mixture of polyether polyols (as described in, for example, DE-A 2,736,085) having the same OH value and functionality as the polyesterether polyol of the crosslinking agent mixture according to the present invention (example 19) is used, the incorporation of fillers into this crosslinking agent mixture rapidly brings about the separation of the filler from the liquid polyol component (working example 20, analogue DE-A 2,736,685). Separation is also observed if, in example 19, the component (polyesterether polyol) according to the invention is removed and replaced by the same weight of the long-chain polyether (see example 21).

The polyurethane elastomers produced according to the invention may be colored, and may be processed to yield light-stable and oxygen-resistant moldings which do not yellow.

The polyesterether polyols used according to the invention (diesterpolyether diols) have 3 to 7, preferably 5 to 6 mol of ester groups/kg of polyesterether polyol. These may be produced according to known methods such as, for example, by the reaction of aromatic carboxylic acid anhydrides with (oligo)ethylene glycols and subsequent ethoxylation. They are preferably made from phthalic anhydride, diethylene glycol and ethylene oxide. These polyesterether polyols have an aromatics content of 40 to 60 wt. %, and an ethylene oxide content —($CH_2CH_2O$)— of 40 to 60 wt. %.

The polyesterether polyol used as component c) of the present invention, is present in amounts of about 10 to 42 wt. %, preferably of about 19 to 42 wt. % (at an isocyanate index of 100), based on 100 wt. % of the reaction mixture (polymer matrix), without fillers.

The urethane group content relative to the polymer matrix at an index of 100 without fillers is greater than 1.4 mol/kg of elastomer, and preferably 1.8 to 3 mol/kg of elastomer.

The node density in the elastomer is greater than 0.5, preferably 0.8 to 1.9 mol of nodes/kg of elastomer.

The polyurethane elastomers produced according to the present invention may be used in automotive construction such as, for example, for the production of automotive components such as bumpers, door sills and wing liners, protective bars, etc.

Isocyanate components a) which may be used in accordance with the present invention are those aliphatic, cycloaliphatic, araliphatic isocyanates as are described, for example, in *Justus Liebigs Annalen der Chemie*, 562, pages 75–136. Aliphatic and cycloaliphatic diisocyanates, such as for example 1,6-hexamethylene diisocyanate (HDI), 1,4-diisocyanatocyclohexane, 1-isocyanato-2,2,5-trimethyl-5-isocyanato-methylcyclohexane (IPDI), 4,4-diisocyanato-dicyclohexylmethane or xylylene diisocyanate are preferred and the biuretized and/or allophanatized and/or trimerized variants of these isocyanates are particularly preferred, in particular those of HDI or IPDI.

The isocyanate-reactive compounds b) used in accordance with the present invention are polyether polyols or the mixtures thereof, which are produced in a manner known per se by alkoxylating suitable starter molecules or mixtures, wherein propylene oxide is in particular used for alkoxylation, optionally together with ethylene oxide. The compounds have an average molecular weight of about 1000 to about 6000 and an average functionality of at least 2. Suitable starter molecules include, for example, water, ethylene glycol, propylene glycol, trimethylenepropane, glycerol, pentaerythritol, sorbitol or cane sugar. Preferred polyether polyols are those having a primary OH group content of above 50%, particularly preferably of greater than 70%. Such polyether polyols are obtained by terminal grafting of ethylene oxide. Polyether polyols complying with the definition and containing dispersed fillers are also suitable, as are, for example, polyols obtained by polymerizing acrylonitrile and/or styrene in the polyethers as the reaction medium (as described in, for example, DE-A 3,827,595 and the literature cited therein).

Other isocyanate-reactive compounds c), in addition to the polyether ester compound c), suitable for use in accordance with the present invention, have an average molecular weight of less than 1000, preferably of less than about 500, and include, for example, compounds such as ethylene glycol, 1,4-butanediol, hexanediol, diethylene glycol, neopentyl glycol or mixtures thereof. 2-Methyl-1,3-propanediol mixtures may also contain monofunctional alcohols.

Component d) the fillers are selected from the various mineral or organic substances, preferably fibers (such as, for example, glass fibers).

Additives and auxiliary substances e) to used in the reaction mixture according to the present invention include, for example, dyes, pigments, blowing agents and/or internal release agents such as zinc stearate or polyetherpolysiloxanes. Such per se known auxiliary substances and additives are described, for example, in EP-A 81,701.

EXAMPLES

The formulations described in the following examples were processed by reaction injection molding.

The compounds containing NCO groups (=component A) and component B were introduced into a high pressure metering unit and, after vigorous mixing in a positively controlled mixing head, injected as quickly as possible into a hot metal mold (T=≦100° C.), wherein the mold interior had been coated with a conventional commercial ready-to-use soap-based external mold release agent RTCW 2006 from Chem Trend.

The steel sheet mold allows the production of test sheets of dimensions 300×200×3 mm. The mold is filled from the longitudinal side through a restrictor bar gate.

The elastomers were characterized by their Shore D/A hardness (DIN 53 505), bulk density (DIN 53 420), stress, tear strength, elongation at break (DIN 53 504) and tear propagation strength (DIN 53 515).

Examples according to the invention are summarized in Tables 1a to 1c; examples not according to the invention are shown in Table 2. Examples 19 to 24 describe filler holding capacity. The values stated in brackets [] are weight percentages in the elastomer (at an index of 100). H:U=mol of urea: mol of urethane/kg of elastomer (at an index of 100);

$$\text{mol of nodes/kg of elastomer} = \sum_{i=1}^{n} \left( gi / \sum_{i=1}^{n} gi \right) *(fi-2)*1000/MWi$$

wherein:
n: equals the number of all components,
gi: equals parts by weight of component i,
fi: equals functionality of component i,
MWi: equals molecular weight of component i in [g]; and
if fi: equals 0, then there are 0 mol of nodes/kg.

Aliphatic isocyanate with f=2 and MW=174 reacts with trifunctional polyol of MW=300
Sample Calculation

| 1. | Isocyanate node density | = | (2-2)*1000/174 = 0 | [mol of nodes/kg] |
|---|---|---|---|---|
| 2. | Polyol node density | = | (3-2)*1000/300 = 3.33 | [mol of nodes/kg] |
| 3. | Aliphatic isocyanate:polyol mixing ratio | = = | polyol for index = 1 87:100 | |
| 4. | Elastomer node density | = | (0*87 + 100*3.33)/(87 + 100) 1.782 | [mol of nodes/kg] |

Description of components used in the examples:

Polyol 1: a polyetherester polyol having an OH value of 310, produced by reaction of 1 mol of phthalic anhydride with 2 mol of diethylene glycol and subsequent ethoxylation of the polyester.

Polyol 2: a polyether polyol having an OH value of 28, produced by propoxylation of propylene glycol and subsequent ethoxylation (PO:EO=79:21)

Polyol 3: a polyether polyol having an OH value of 630, produced by propoxylation of ethylenediamine.

Polyol 4: a polyether polyol having an OH value of 28, produced by propoxylation of trimethylolpropane and subsequent ethoxylation (PO:EO=86.5:13.5).

Polyol 5: a polyether polyol having an OH value of 550, produced by ethoxylation of trimethylolpropane Polyol 6: a polyether polyol having an OH value of 330, produced by propoxylation of 2-butene-1,4-diol.

Polyol 7: a polyether polyol having an OH value of 190, produced by propoxylation of propylene glycol and subsequent ethoxylation (PO:EO=0.6:99.4).

Polyol 8: a polyether polyol having an OH value of 270, produced by propoxylation of propylene glycol.

Polyol 9: a hexanediol-based polyricinoleic acid ester having an OH value of 35.

Polyol 10: a polyester prepared from phthalic anhydride and diethylene glycol having an OH value of 318.

Polyol 11: a polyether polyol having an OH value of 28, produced by propoxylation of trimethylolpropane and subsequent ethoxylation (PO:EO weight ratio=78:22).

Polyol 12: Jeffamine D 400®, a polyetherdiamine (based on PO), commercially available from Texaco, having a molecular weight of 400.

Tinuvin B75®: a UV stabilizer, commercially available from Ciba Geigy, NH value=53.

Red paste: a polyether polyol having an OH value of 28, (PO:EO=87:13) produced by propoxylation of trimethylolpropane and subsequent ethoxylation, containing approximately 15% of powdered colorant.

Fomrez UL 28®: dimethyltin dilaurate.

DBTL®: dibutyltin dilaurate.

Dabco 33 LV®: 33% solution of triethylenediamine in dipropylene glycol.

B8901®: a conventional commercial polyetherpolysiloxane from Goldschmidt, Essen.

A1100®: aminosilane: 1-amino-3-triethoxysilanepropane.

Tegomer HS 2311®: α,ω-hydroxyfunctional polydimethylsiloxanes with a functionality of 2 and an OH value of 45 from Goldschmidt.

Isocyanate A: hexamethylene diisocyanate trimer, NCO content 21.6%, functionality approximately 3.5, commercially available from Bayer AG.

MF 7980®: glass fiber, commercially available from Bayer AG.

TABLE 1a

Examples according to the invention

| | Example | | |
|---|---|---|---|
| | 1 | 5 | 8 |
| Polyol 1 | 87.97 [36.56] | 46.85 [29.90] | 41.43 [26.46] |
| Polyol 2 | *** | 42.16 [26.91] | 49.97 [31.92] |
| Ethylene glycol | 7.04 [2.92] | *** | *** |
| Tinuvin B 75 ® | 2.46 [1.02] | 1.64 [1.05] | 1.61 [1.03] |
| Fomrez ® UL 28 | 1.94 [0.82] | 1.26 [0.81] | 1.25 [0.80] |
| Dabco 33 LV ® | 0.48 [0.20] | 0.32 [0.20] | 0.31 [0.20] |
| DBTDL ® | 0.11 [0.05] | 0.08 [0.05] | 0.08 [0.05] |
| Red paste | *** | 4.68 [2.99] | *** |
| Polyol 3 | *** | *** | 5.52 [1.61] |
| H S 2311 ® | *** | 2.15 [1.38] | 2.08 [1.33] |
| B 8901 ® | *** | 0.84 [0.54] | 0.74 [0.47] |
| A 1100 ® | 0.005 [0.002] | 0.005 [0.002] | 0.005 [0.002] |
| MF 7980 ® (% in elastomer) | 15% | 15% | 15% |
| Ratio at index = 100 (pol:iso) | 100.00:140.63 | 100.00:56.67 | 100.00:56.58 |
| Index | 110 | 110 | 110 |
| Isocyanate | A | A | A |
| mol/kg H:U | 0.01:2.98 | 0.01:1.84 | 0.01:1.84 |
| mol of nodes/kg of elastomer | 1.301 | 0.811 | 0.895 |
| Mechanical properties | | | |
| Shore D | 84 | 54 | 45 |
| Bulk density (g/cm³) | — | 1.263 | 1.246 |
| Water absorption, 1 day (%) | — | 2.17 | 2.34 |
| Water absorption, 7 days (%) | — | 4.5 | 4.71 |
| 10% stress (MPa) | 0 | 10 | 6 |

5,750,580

TABLE 1a-continued

Examples according to the invention

| | Example | | |
|---|---|---|---|
| | 1 | 5 | 8 |
| 100% stress (MPa) | 0 | 0 | 0 |
| Tear strength (MPa) | 70 | 13 | 10 |
| Elongation at break (%) | 2 | 66 | 80 |
| SAG test 100 mm (mm) | 42 | 54 | 51 |
| SAG test 150 mm (mm) | — | — | — |
| Tear propagation strength (kN/m) | — | 45 | 23 |

TABLE 1b

Examples according to the invention (glass content)

| | Example | |
|---|---|---|
| | 9 | 10 |
| Polyol 1 | 53.18 [31.79] | 51.08 [30.53] |
| Polyol 2 | *** | 39.33 [23.50] |
| Polyol 4 | 38.67 [23.11] | *** |
| Tinuvin B 75 ® | 1.72 [1.03] | 1.72 [1.03] |
| Fomrez UL 28 ® | 1.34 [0.80] | 1.34 [0.80] |
| Dabco 33 LV ® | 0.34 [0.20] | 0.34 [0.20] |
| DBTL ® | 0.08 [0.05] | 0.08 [0.05] |
| Polyol 3 | 1.66 [0.99] | 3.10 [1.85] |
| H S 2311 ® | 2.23 [1.33] | 2.23 [1.33] |
| B 8901 ® | 0.79 [0.47] | 0.79 [0.47] |
| A 1100 ® | 0.005 [0.003] | 0.005 [0.002] |
| MF 7980 ® (% in elastomer) | 15% | 15% |
| Ratio at index = 100 (pol:iso) | 100.00:67.31 | 100.00:67.33 |
| Index | 110 | 110 |
| Isocyanate | A | A |
| mol/kg H:U | 0.01:2.05 | 0.01:2.05 |
| mol of nodes/kg of elastomer | 1.000 | 1.000 |
| Mechanical properties | | |
| Shore D | 68 | 63 |
| Sheet thickness (mm) | 2.80 | 2.81 |
| Bulk density (g/cm³) | 1.279 | 1.319 |
| Water absorption, 1 day (%) | 0.66 | 0.92 |
| Water absorption, 7 days (%) | 1.55 | |
| 10% stress (MPa) | 24 | 27 |
| 100% stress (MPa) | 0 | 0 |
| Tear strength (MPa) | 26 | 27 |
| Elongation at break (%) | 14 | 13 |
| SAG test 100 mm (mm) | 61 | 67 |
| SAG test 150 mm (mm) | — | — |
| Tear propagation strength (kN/m) | 53 | 64 |
| Shrinkage (longitudinal) (%) | 0.609 | 0.561 |
| Shrinkage (transverse) (%) | 1.050 | 1.334 |

TABLE 1c

Examples according to the invention

| | Example | | | |
|---|---|---|---|---|
| | 11 | 12 | 13 | 14 |
| Polyol 1 | 51.08 [30.53] | 49.54 [29.97] | 50.63 [30.43] | 54.31 [31.48] |
| Polyol 2 | 39.33 [23.50] | 38.14 [23.07] | 38.99 [23.43] | 31.53 [18.28] |

TABLE 1c-continued

Examples according to the invention

| | Example | | | |
|---|---|---|---|---|
| | 11 | 12 | 13 | 14 |
| Polyol 5 | *** | *** | *** | 2.37 [1.95] |
| Jeffamine D 400 ® Polyol 12 | *** | *** | *** | 3.19 [1.85] |
| Tinuvin B 75 ® | 1.72 [1.03] | 1.67 [1.01] | 1.71 [1.03] | 1.77 [1.03] |
| Fomrez UL 28 ® | 1.34 [0.80] | 1.30 [0.79] | 1.33 [0.80] | 1.38 [0.80] |
| Dabco 33 LV ® | 0.34 [0.20] | 0.33 [0.20] | 0.34 [0.20] | 0.35 [0.20] |
| DBTDL ® | 0.08 [0.05] | 0.08 [0.05] | 0.08 [0.05] | 0.08 [0.05] |
| Polyol 3 | 3.10 [1.85] | 3.01 [1.82] | 3.07 [1.85] | *** |
| Zinc stearate | *** | 3.01 [1.82] | 3.07 [1.85] | 3.10 [1.85] |
| H S 2311 ® | 2.23 [1.33] | 2.16 [1.31] | *** | *** |
| B 8901 ® | 0.79 [0.47] | 0.77 [0.46] | 0.78 [0.47] | 0.81 [0.47] |
| A 1100 ® | 0.005 [0.003] | 0.005 [0.003] | 0.005 [0.003] | 0.005 [0.003] |
| MF 7980 ® (% in elastomer) | 15% | 15% | 15% | 15% |
| Ratio at index = 100 (pol:iso) | 100.00:67.33 | 100.00:65.31 | 100.00:66.33 | 100.00:72.52 |
| Index | 110 | 110 | 110 | 110 |
| Isocyanate | A | A | A | A |
| mol/kg H:U | 0.01:2.05 | 0.01:2.05 | 0.01:2.01 | 0.1:2.05 |
| mol of nodes/kg of elastomer | 1.000 | 0.982 | 0.992 | 1.000 |
| Mechanical properties | | | | |
| Shore D | 60 | 59 | 63 | 66 |
| Sheet thickness (mm) | 2.81 | 2.80 | 2.85 | 2.81 |
| Bulk density (g/cm³) | 1.35 | 1.21 | 1.26 | 0.84 |
| Water absorption, 1 day (%) | 1.35 | 1.21 | 1.26 | 0.84 |
| 10% stress (MPa) | 15 | 18 | 19 | 19 |
| 100% stress (MPa) | 0 | 0 | 0 | 0 |
| Tear strength (MPa) | 15 | 19 | 20 | 20 |
| Elongation at break (%) | 63 | 58 | 41 | 84 |
| SAG test 100 mm (mm) | 50 | 53 | 36 | 20 |
| SAG test 150 mm (mm) | — | — | — | 78 |
| Tear propagation strength (%) | 60 | 66 | 69 | 77 |
| Shrinkage (longitudinal) (%) | 0.579 | 0.825 | 0.886 | 0.713 |
| Shrinkage (transversal) (%) | 1.254 | 1.409 | 1.313 | 1.465 |
| Release behavior - sprue | satisfactory | good to very good | good | good |
| Release behavior - sheet | good | very good | very good | very good |

TABLE 2a

Examples not according to the invention

| | Example | | |
|---|---|---|---|
| | 16 | 17 | 18 |
| Polyol 2 | 26.10 [15.60] | 42.66 [25.49] | *** |
| Polyol 6 | *** | 47.70 [28.51] | 46.70 [27.91] |
| Polyol 7 | 14.28 [8.53] | *** | *** |
| Polyol 8 | 49.98 [29.87] | *** | *** |
| Polyol 9 | *** | *** | 43.66 [26.09] |
| Polyol 3 | 3.09 [1.85] | 3.10 [1.85] | 3.10 [1.85] |
| Tinuvin B 75 ® | 1.77 [1.06] | 1.77 [1.06] | 1.77 [1.06] |
| Fomrez UL 28 ® | 1.34 [0.80] | 1.34 [0.80] | 1.34 [0.80] |
| Dabco 33 LV ® | 0.34 [0.20] | 0.34 [0.20] | 0.34 [0.20] |
| DBTDL ® | 0.08 [0.05] | 0.08 [0.05] | 0.08 [0.05] |
| H S 2311 ® | 2.23 [1.33] | 2.23 [1.33] | 2.23 [1.33] |
| B 8901 ® | 0.79 [0.47] | 0.79 [0.47] | 0.79 [0.47] |
| A 1100 ® | 0.005 [0.003] | 0.005 [0.003] | 0.005 [0.003] |
| MF 7980 (% in elastomer) | 15% | 15% | 15% |
| Ratio at index = 100 (pol:iso) | 100.00:67.34 | 100.00:67.34 | 100.00:67.34 |
| Index | 110 | 110 | 110 |
| Isocyanate | A | A | A |
| mol/kg H:U | 0.01:2.05 | 0.01:2.05 | 0.01:2.05 |
| mol of nodes/kg of elastomer | 1.000 | 1.000 | 1.000 |
| Mechanical properties | | | |
| Shore D | 23 | 23 | 20 |

Mechanical properties could not be measured as the moldings could easily be torn by hand.

Examples of filler holding capacity of polyol formulations:

Sedimentation properties:

Equipment:

Laboratory stirrer (from Jahnke & Kunkel)

Paddle agitator, ø 100 mm

Tinplate can, 1000 ml

Measuring cylinder (500:5) DIN In 20° C.±2.5 ml

Method:

The polyol mixtures listed in table 3 were initially introduced into a 1000 ml tinplate can. The appropriate quantity of glass fiber (MF 7980) was added at room temperature and stirred in within 5 minutes with a laboratory paddle stirrer (ø 100 mm) at a maximum stirring speed of 1000 rpm.

500 ml (500 scale divisions) of the polyol/glass fiber mixture were then transferred into a measuring cylinder.

Evaluation:

At the beginning of measurement, the glass fibers were observed to be uniformly distributed over the entire measuring scale (500 scale divisions).

The sedimentation value stated in the table (glass/polyol "phase separation") describes the height of the settled glass fibers (scale divisions) in the polyol component after 70 hours at room temperature.

TABLE 3

Sedimentation of glass fibers in polyol mixtures according to the invention and not according to the invention

| | Example | | | | | |
|---|---|---|---|---|---|---|
| | 19 | 20 | 21 | 22 | 23 | 24 |
| Phase separation[a] | none | yes | none | none | yes | yes |
| Polyol 1 | 51.08 | *** | *** | *** | *** | *** |
| Polyol 10 | *** | 51.08 | *** | *** | *** | *** |
| Polyol 7 | *** | *** | *** | 14.28 | *** | *** |
| Polyol 8 | *** | *** | *** | 49.98 | *** | *** |
| Polyol 2 | 39.33 | 39.33 | 90.41 | 26.1 | *** | *** |
| Polyol 11 | *** | *** | *** | *** | 75.20 | 78.20 |
| Ethylene glycol | *** | *** | *** | *** | 21.20 | 21.20 |
| DETDA ® | *** | *** | *** | *** | 6.00 | *** |
| Tinuvin B 75 | 1.72 | 1.72 | 1.72 | 1.77 | *** | *** |
| Fomrez UL 28 ® | 1.34 | 1.34 | 1.34 | 1.34 | *** | *** |
| Dabco 33 LV ® | 0.34 | 0.34 | 0.34 | 0.34 | 0.50 | 0.50 |
| DBTDL ® | 0.08 | 0.08 | 0.08 | 0.08 | 0.10 | 0.10 |
| Polyol 3 | 3.10 | 3.10 | 3.10 | 3.10 | *** | *** |
| H S 2311 ® | 2.23 | 2.23 | 2.23 | 2.23 | *** | *** |
| B 8901 ® | 0.79 | 0.79 | 0.79 | 0.79 | *** | *** |
| A 1100 ® | 0.005 | 0.005 | 0.005 | 0.005 | *** | *** |
| OH value/functionality | 193.3/2.11 | 193.3/2.11 | 49.3/2.49 | 193.4/2.11 | 431.0/2.03 | 407.0/2.04 |
| Polyol (%) | 76.5  69.7 | 76.5  69.7 | 76.5  69.7 | 76.5  69.7 | 76.5  69.7 | 76.5  69.7 |
| Glass fiber MF 7980 (%) | 23.5  30.3 | 23.5  30.3 | 23.5  30.3 | 23.5  30.3 | 23.5  30.3 | 23.5  30.3 |
| Sedimentation (scale divisions)[b] | 500  500 | 190  260 | 260  350 | 170  240 | 310  430 | 410  490 |

[a]compatability of the polyol formulation
500 Δ not settled
[b]separation of polyols and glass fibers Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane elastomer which optionally contains urea groups and comprises the reaction product of:

a) at least one liquid polyisocyanate component selected from the group consisting of aliphatic polyisocyanates, alicyclic polyisocyanates and mixtures thereof, b) optionally, one or more isocyanate-reactive compounds having an average molecular weight of about 1000 to 6000 and an average functionality of at least two, c) from about 10 to about 42% by weight, based on 100% by weight of the reaction mixture without fillers, of at least one isocyanate-reactive compound comprising a polyesterether polyol having a molecular weight of less than 500 and a functionality of at least two, wherein said polyesterether polyol contains from 3 to 7 mol of ester groups/kg of polyesterether polyol, and an ethylene oxide content of from 40 to 60% by weight, and said polyesterether polyol consists of the reaction product of aromatic carboxylic acid anhydrides with (oligo) ethylene glycols, and subsequent ethoxylation, and d) 1 to 30% by weight, based on the total weight of all the components, of fillers, wherein components a) through d) are reacted via the reaction injection molding process.

2. The polyurethane elastomer of claim 1, wherein the reaction product additionally comprises:

e) additives.

3. A process for the production of polyurethane moldings having a closed surface, a density of greater than 0.9 g/cm$^3$, optionally contains urea groups and are optionally cellular, by the reaction injection molding process of a reaction mixture comprising:

a) at least one liquid polyisocyanate component selected from the group consisting of aliphatic polyisocyanates, alicyclic polyisocyanates and mixtures thereof, b) optionally, one or more isocyanate-reactive compounds having an average molecular weight of about 1000 to 6000 and an average functionality of at least two, c) from about 10 to about 42% by weight, based on 100% by weight of the reaction mixture without fillers, of at least one isocyanate-reactive compound comprising a polyesterether polyol having a molecular weight of less than 500 and a functionality of at least two, wherein said polyesterether polyol contains from 3 to 7 mol of ester groups/kg of polyesterether polyol, and an ethylene oxide content of from 40 to 60% by weight, and said polyesterether polyol consists of the reaction product of aromatic carboxylic acid anhydrides with (oligo) ethylene glycols, and subsequent ethoxylation, and d) 1 to 30% by weight, based on the total weight of all the components, of fillers.

4. The process of claim 3, wherein said reaction mixture additionally comprises:

e) additives.

* * * * *